(12) United States Patent
Hamid

(10) Patent No.: US 9,064,114 B2
(45) Date of Patent: *Jun. 23, 2015

(54) METHOD AND DEVICE FOR SCANNING DATA FOR SIGNATURES PRIOR TO STORAGE IN A STORAGE DEVICE

(71) Applicant: Imation Corp., Oakdale, MN (US)

(72) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,691

(22) Filed: Jan. 14, 2014

(65) Prior Publication Data

US 2014/0230063 A1 Aug. 14, 2014

Related U.S. Application Data

(63) Continuation of application No. 11/480,968, filed on Jul. 6, 2006, now Pat. No. 8,631,494.

(51) Int. Cl.
*H04L 29/06* (2006.01)
*G06F 21/56* (2013.01)
*G06F 21/79* (2013.01)
*G06F 21/80* (2013.01)
*G06F 21/85* (2013.01)

(52) U.S. Cl.
CPC .............. *G06F 21/564* (2013.01); *G06F 21/79* (2013.01); *G06F 21/80* (2013.01); *G06F 21/85* (2013.01)

(58) Field of Classification Search
CPC .................................................... G06F 21/564
USPC ...................................................... 726/23, 24
See application file for complete search history.

(56) References Cited

U.S. PATENT DOCUMENTS

| | | | |
|---|---|---|---|
| 5,319,776 A | 6/1994 | Hile et al. | |
| 5,623,600 A | 4/1997 | Ji et al. | |
| 6,760,796 B1 | 7/2004 | Rossmann et al. | |
| 6,842,861 B1 * | 1/2005 | Cox et al. | 713/188 |
| 7,546,471 B2 * | 6/2009 | Phillips et al. | 713/188 |
| 8,393,001 B1 * | 3/2013 | Libenzi et al. | 726/26 |
| 2002/0073340 A1 | 6/2002 | Mambakkam et al. | |

(Continued)

FOREIGN PATENT DOCUMENTS

WO WO2005109302 A2 11/2005
WO WO2007069245 A2 6/2007

*Primary Examiner* — Mohammad L Rahman
(74) *Attorney, Agent, or Firm* — Dorsey & Whitney LLP

(57) ABSTRACT

The present invention relates to a method and device for scanning of data for signatures prior to storage. First data are received at a storage device for storage therein. Upon receipt the first data are stored in a temporary storage medium for storing other than guaranteed previously scanned data. Using a processor of the storage device, the first data are compared with at least a predetermined signature and a comparison result is determined in dependence thereupon. In dependence upon the comparison result the first data are provided to the scanned data memory when the comparison result is indicative of other than a match or the first data are other than provided to the scanned data memory when the comparison result is indicative of a match. The method and the device according to the invention substantially reduce the risk that a file infected with a computer virus is transferred from one computer to another via a portable storage medium. In another aspect of the invention, the method and the device according to the invention prevents storage of sensitive data by unauthorized persons.

41 Claims, 10 Drawing Sheets

(56) References Cited

U.S. PATENT DOCUMENTS

| | | |
|---|---|---|
| 2002/0103783 A1 | 8/2002 | Muhlestein |
| 2002/0194499 A1 | 12/2002 | Audebert et al. |
| 2003/0005337 A1 | 1/2003 | Poo et al. |
| 2003/0009690 A1 | 1/2003 | Grupe |
| 2005/0109841 A1 | 5/2005 | Ryan et al. |
| 2005/0216759 A1 | 9/2005 | Rothman et al. |
| 2006/0037079 A1 | 2/2006 | Midgley |
| 2006/0064755 A1 | 3/2006 | Azadet et al. |
| 2006/0065743 A1 | 3/2006 | Fruhauf |
| 2006/0168653 A1 | 7/2006 | Contrera |
| 2006/0230203 A1 | 10/2006 | Cheng et al. |
| 2006/0242686 A1 | 10/2006 | Toda et al. |
| 2006/0284632 A1 | 12/2006 | Braverman et al. |
| 2007/0083939 A1 | 4/2007 | Fruhauf et al. |
| 2007/0261118 A1 | 11/2007 | Lu |

\* cited by examiner

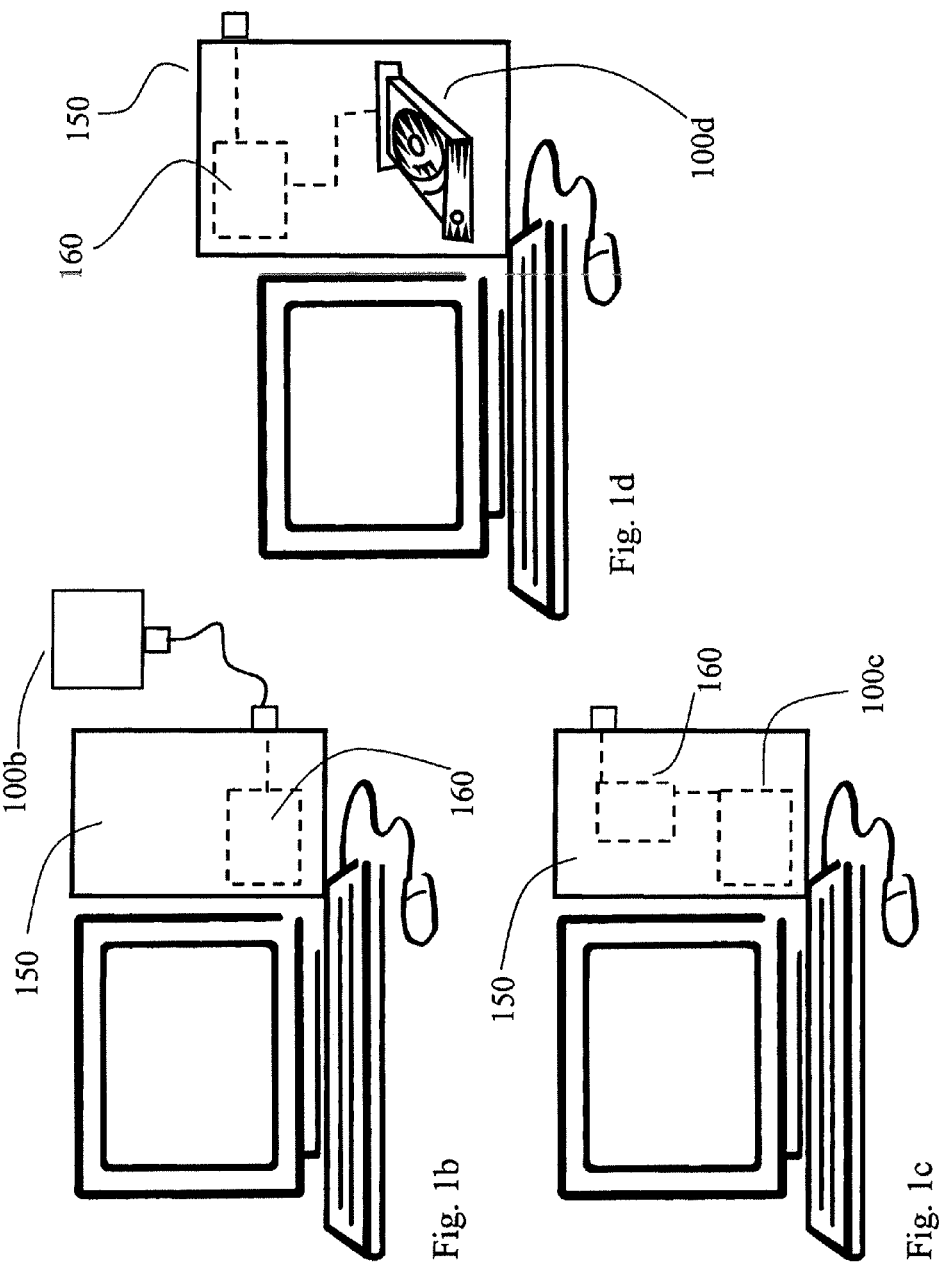

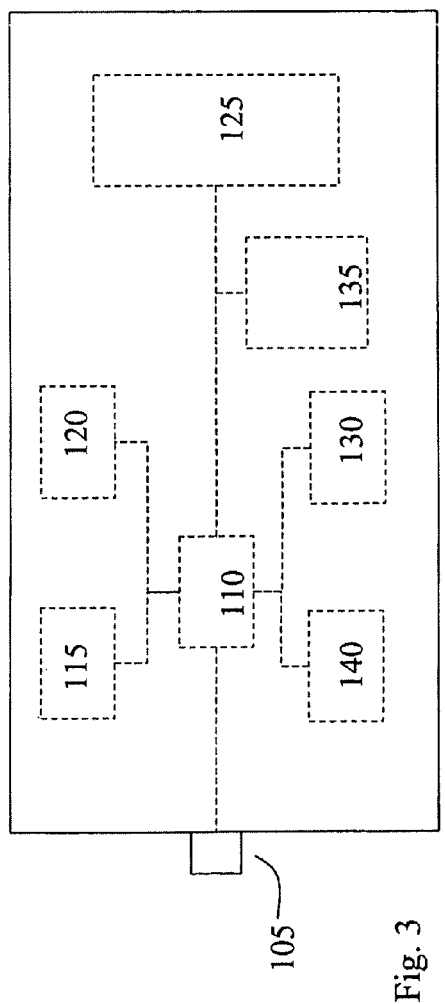
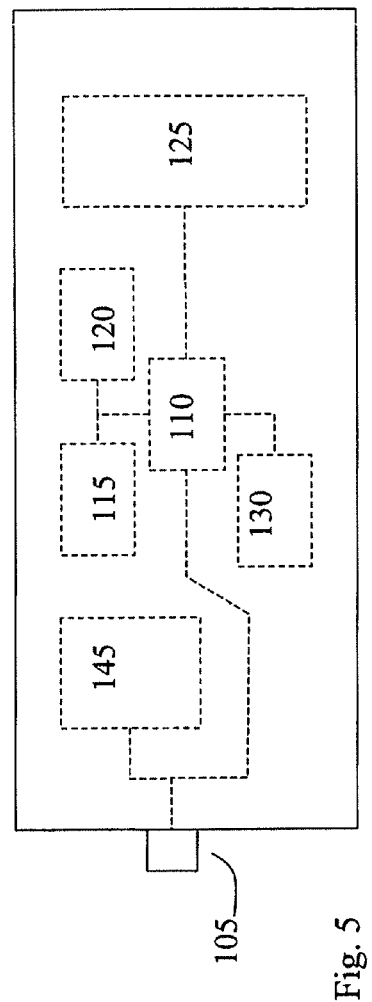
Fig. 3
Fig. 5

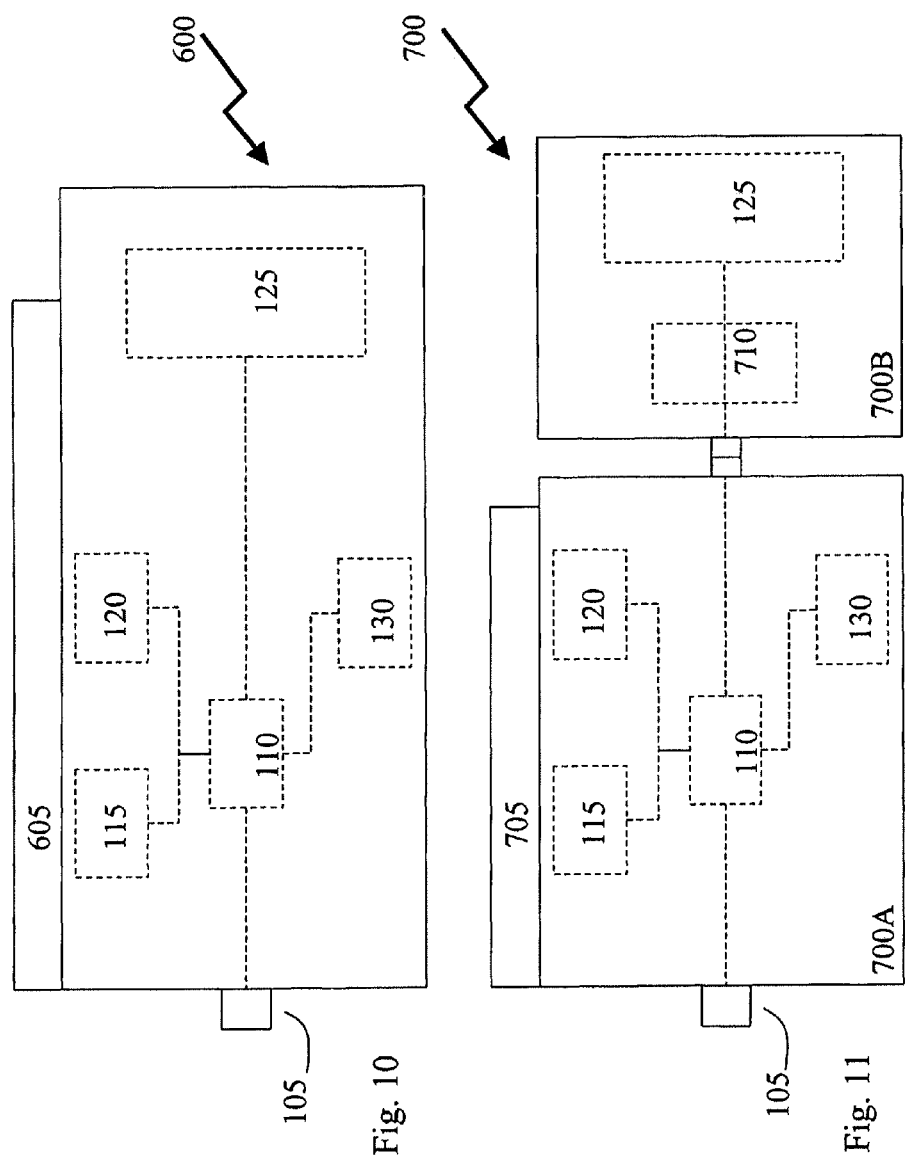

METHOD AND DEVICE FOR SCANNING DATA FOR SIGNATURES PRIOR TO STORAGE IN A STORAGE DEVICE

This application is a continuation of U.S. patent application Ser. No. 11/480,968, filed Jul. 6, 2006, METHOD AND DEVICE FOR SCANNING DATA FOR SIGNATURES PRIOR TO STORAGE IN A STORAGE DEVICE, issued Jan. 14, 2014, as U.S. Pat. No. 8,631,494.

FIELD OF THE INVENTION

This invention relates to the field of computer safety and in particular to a method and device for scanning data for signatures prior to storage in a storage device.

BACKGROUND

With the proliferation of computers and computer networks into all aspects of business and daily life—financial, medical, education, government, and communications—the concern over computer security is growing. A major issue in computer security is the problem of computer viruses. A computer virus is generally a manmade destructive computer program or code that is loaded onto a computer system without the knowledge of the user. The computer virus is often a self-replicating program that copies itself and infects other programs and data files by modifying them or their environment. The computer virus spreads from one computer to another when an infected computer program or data file is taken to the uninfected computer, for example, by a user sending it over a network or carrying it on a portable storage medium. While some computer viruses are intentionally destructive, for example, deleting data, many other viruses are fairly benign. However, even such viruses are dangerous as they are able to access systems, potentially utilizing a large portion of the available resources and possibly shutting down an infected computer system.

Many antivirus programs have become commercially available for protection against viruses. Most commercially available antivirus programs scan computer files to look for known viruses by comparing the data of the computer file with signatures in a dictionary of known viruses that the authors of the antivirus software have identified. If some data in the computer file match a signature of a virus identified in the dictionary, the antivirus software takes one of the following actions:

attempts to repair the infected file by removing the virus from the file;

quarantines the infected file such that the file remains inaccessible to other programs and its virus can no longer spread; and, deletes the infected file.

As is evident, the signatures in the dictionary need to be updated on a regular basis. The antivirus software typically examines files when a computer's operating system creates, opens, closes, downloads, or e-mails them. Furthermore, the antivirus software is usually scheduled to scan all files on the computer's hard-drive on a regular basis. However, this still leaves a loophole for spreading a computer virus before a dictionary is updated.

With ever increasing storage capacity of portable storage devices such as CDs, DVDs, and USB memory storage keys, manual file transfer from one computer to another is substantially facilitated. Unfortunately, this also increases the risk of transferring an infected file from one computer to another.

Furthermore, the increasing storage capacity of USB memory storage keys presents a significant security challenge for large organizations. Their small size and ease of use allows unsupervised visitors or unscrupulous employees to smuggle confidential data with little chance of detection. To prevent this, some organizations—particularly government departments and larger corporations—forbid the use of USB memory storage keys, and computers are configured to disable the mounting of USB memory storage keys. Some organizations use a lower-tech security solution, disconnecting USB ports inside the computer or filling the USB ports with glue.

It would be highly desirable to overcome the drawbacks of the present technology and to increase computer security.

SUMMARY OF THE INVENTION

It is, therefore, an object of embodiments of the invention to provide a method and device for supporting scanning of data for signatures prior to storage in a storage device.

It is an advantage of some embodiments of the invention to provide a method and device for supporting scanning of data for signatures prior to storage in a USB memory storage key.

In accordance with the present invention there is provided a method for storing data in a storage device comprising:

receiving, at the storage device, first data for being stored within the storage device;

storing the first data in a temporary storage medium within the storage device, the temporary storage medium for storing other than guaranteed previously scanned data;

using circuitry of the storage device comparing the first data with at least a predetermined signature and determining a comparison result in dependence thereupon; and, performing, in dependence upon the comparison result, one of providing the first data for storage within a scanned data memory of the storage device, the scanned data memory for storing guaranteed previously scanned data therein, when the comparison result is indicative of other than a match, and other than providing the first data for storage within the scanned data memory when the comparison result is indicative of a match.

In accordance with the present invention there is further provided a storage device comprising:

a first port for receiving first data for being stored within the storage device;

a temporary storage medium in communication with the first port for storing other than guaranteed previously scanned data;

a scanned data memory for storing guaranteed previously scanned data therein;

circuitry in communication with the first port, the temporary storage medium and the scanned data memory, the circuitry for:

a) comparing the first data with at least a predetermined signature and determining a comparison result in dependence thereupon; and, b) performing, in dependence upon the comparison result, one of providing the first data for storage within the scanned data memory when the comparison result is indicative of other than a match, and other than providing the first data for storage within the scanned data memory when the comparison result is indicative of a match.

In accordance with the present invention there is yet further provided a coupler comprising:

a first interface for coupling to a port of a host system for receiving first data for being stored in a scanned data memory of a portable storage device, the scanned data memory for storing guaranteed previously scanned data therein;

a second interface for interfacing with the portable storage device;

a temporary storage medium in communication with the first interface for storing other than guaranteed previously scanned data;

circuitry in communication with the first interface, the temporary storage medium and the second interface, the circuitry for:

a) comparing the first data with predetermined signatures and determining a comparison result in dependence thereupon; and, b) performing, in dependence upon the comparison result, one of providing via the second interface the first data for storage within the scanned data memory when the comparison result is indicative of other than a match, and other than providing the first data for storage within the scanned data memory when the comparison result is indicative of a match.

In accordance with the present invention there is yet further provided a storage medium having stored therein executable commands for execution on a processor of a host system, the processor when executing the commands performing:

providing first data to a storage device for storage therein when data from the storage device have been received, the data being indicative of a presence of a circuitry for:

comparing the first data with at least a predetermined signature and determining a comparison result in dependence thereupon; and, performing, in dependence upon the comparison result, one of providing the first data for storage within a scanned data memory when the comparison result is indicative of other than a match, and other than providing the first data for storage within the scanned data memory when the comparison result is indicative of a match; and, other than providing the first data to the storage device in the absence of data indicative of the presence of the circuitry.

BRIEF DESCRIPTION OF THE FIGURES

Exemplary embodiments of the invention will now be described in conjunction with the following drawings, in which:

FIGS. 1a to 1d are simplified block diagrams illustrating a first embodiment of a storage device supporting scanning of data for signatures prior to storage according to the invention;

FIG. 3 is a simplified block diagram illustrating a second embodiment of a storage device supporting scanning of data for signatures prior to storage according to the invention;

FIG. 5 is a simplified block diagram illustrating a third embodiment of a storage device supporting scanning of data for signatures prior to storage according to the invention;

FIG. 10 is a simplified block diagram illustrating a sixth embodiment of a storage device supporting scanning of data for signatures prior to storage according to the invention; and, FIG. 11 is a simplified block diagram illustrating a seventh embodiment of a storage device supporting scanning of data for signatures prior to storage according to the invention.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
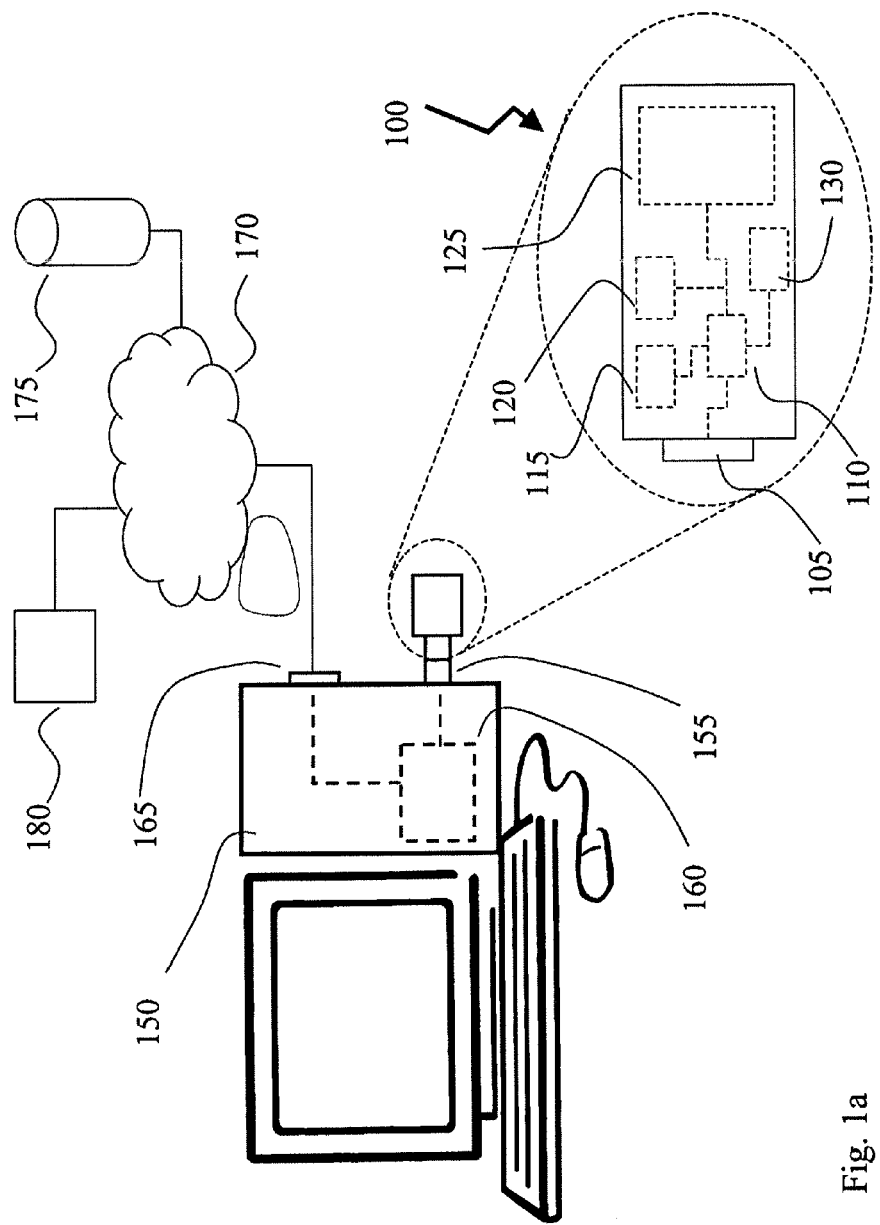

In the following description of the various embodiments same reference numerals are used for same components. Referring to FIG. 1a, a first embodiment of a storage device 100 supporting scanning data for signatures prior to storage is shown. The storage device 100 comprises a port 105 for being mated to a port 155 of a host system 150. Processor 110 of the storage device 100 communicates via the mated ports 105 and 155 with a processor 160 of the host system 150 for receiving first data for being stored within the storage device 100. Upon receipt of and during scanning thereof, the first data are stored in a temporary storage medium 115 in communication with the circuitry 110. Further, the storage device 100 comprises memory 120 in communication with the processor 110 having stored therein executable commands for execution on the processor 110 for communicating with the host system 150 and for processing the first data. The temporary storage medium 115 is used for temporary storage of other than guaranteed previously scanned data and acts, for example, as a register of the processor 110 during: receipt of the first data; scanning of the first data; and provision/retrieval of the first data to/from a scanned data memory 125 in communication with the processor 110. During scanning of the first data, the processor 110 compares the first data with at least a predetermined signature stored in signature memory 130 in communication therewith. Optionally, the at least a predetermined signature are received prior to receipt of the first data and stored in the temporary storage medium 115, allowing omission of the signature memory 130. Alternatively, the processor 110 comprises electronic circuitry designed for performing a portion of the communication and data processing in a hardware implemented fashion. Further alternatively, the peripheral device comprises electronic circuitry for performing the complete communication and data, processing in a hardware implemented fashion, thus allowing omission of the memory 120.

In the present embodiment, the interface 105 is a serial USB interface, for example, a male USB connector, for interfacing with a female USB port 155 of the host system 150. Alternatively, other interfaces are used. The USB interface is advantageous, since the USB standard is well established for connecting a computer to peripheral devices, i.e. most present day computers comprise at least one USB port. The storage device 100 is, for example, implemented using readily available USB memory storage key technology such as a Reduced Instruction Set Computing (RISC) microprocessor, RAM 115, ROM 120, and a NAND flash memory 125. Typically, the various components are disposed on a Printed Circuit Board (PCB) encased in a substantially robust plastic or metal casing making the USB memory storage key sturdy enough to be carried in a pocket without the risk of damaging the components. Using this technology it is possible to provide in a portable storage device 100 a computing platform on which information is stored and computations are performed in a secured fashion.

The invention is not limited to the present embodiment—a portable storage device as shown in FIG. 1a—but is also beneficial when employed, as shown in FIG. 1b, in an external hard-drive 100b coupled to the host system 150 or a computer network and serving, for example, as a back-up, in an internal Hard-Drive 100c disposed inside the host system 150—shown in FIG. 1c, and in an Optical Disk Drive 100d such as a CD or DVD Drive—shown in FIG. 1d. The advantages of providing such storage devices with the capability for scanning of data for signatures prior to storage will readily become apparent to those of skill in the art when discussing various embodiments of a method for scanning data for signatures prior to storage according to the invention below.

Figure 2:
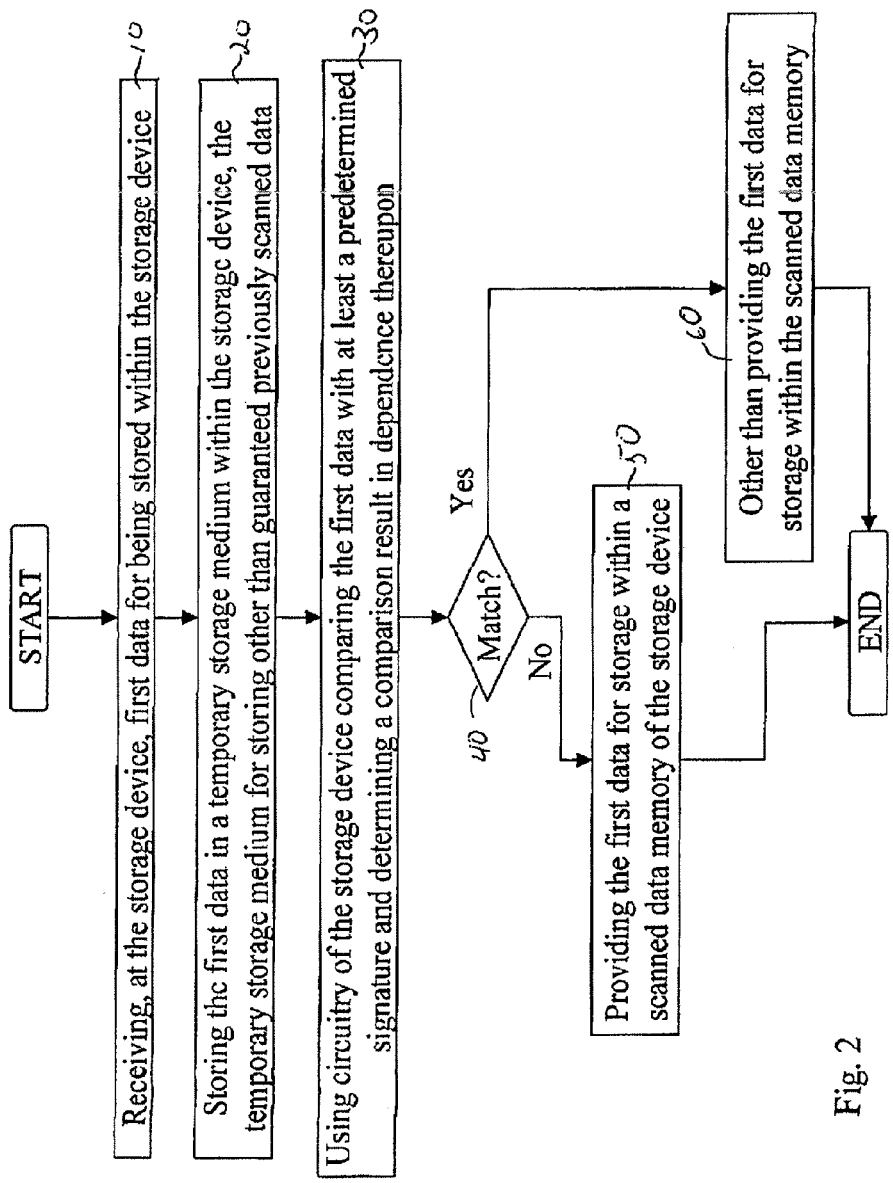
FIG. 2 is a simplified flow diagram illustrating a first embodiment of a method for supporting scanning of data for signatures prior to storage according to the invention.

FIG. 2 illustrates a simplified flow diagram of a first embodiment of a method for scanning data for signatures prior to storage. At 10, first data for being stored within the storage device are received. Upon receipt the first data are stored in the temporary storage medium 115 for storing other than guaranteed previously scanned data—at 20. Using the processor 110 of the storage device, the first data are compared with at least a predetermined signature and a comparison result is determined in dependence thereupon—at 30. In dependence upon the comparison result—at 40—the first data are provided to the scanned data memory 125 when the comparison result is indicative of other than a match—at 50—or the first data are other than provided to the scanned data memory 125 when the comparison result is indicative of a match—at 60. There are several options at 60 for handling the first data such as deleting the first data, repairing the data if possible, for example, by removing the data portion resembling a signature of a computer virus, or storing the first data in a buffer memory 135 for storing other than guaranteed previously scanned data of a second embodiment 200 of a storage device according to the invention, as shown in FIG. 3. Optionally, the processor 110 generates message data indicating that the first data are computer virus free or a computer virus has been detected and provides the same to the processor 160 for displaying the message to the user. Alternatively, the storage device comprises an indicator such as a LED, not shown, for notifying the user, for example, by displaying different colors such as Green when the data are computer virus free and Red when a computer virus has been detected. Further optionally, the processor 110 stores the message data in memory such as the buffer memory 135. This is especially advantageous in the portable storage device 200 which comprises an internal power source 140, such as a battery—or a rechargeable battery—enabling storage of the first data in the buffer memory 135 and scanning of the first data after removal of the portable storage device 200 from the host system. Here, when a computer virus is detected, the first data are kept in the buffer memory 135 and the message data are stored, for example, together with the first data in the buffer memory 135. This enables notification of a user after mating the storage device 200 with a host system of the detected computer virus and, for example, allows the user to retrieve the file and attempt a repair using an antivirus program on the host system.

The method illustrated in FIG. 2 is highly beneficial for scanning the first data for signatures indicative of computer viruses by ensuring that only guaranteed previously scanned data are stored in the scanned data memory 125. For example, employment of this method for storing data in portable storage devices such as USB memory storage keys or optical disks substantially reduces the risk that an infected file is transferred from one computer to another, while employment of this method with Hard-Drives substantially increases the likelihood that a computer virus is detected.

Figure 4:
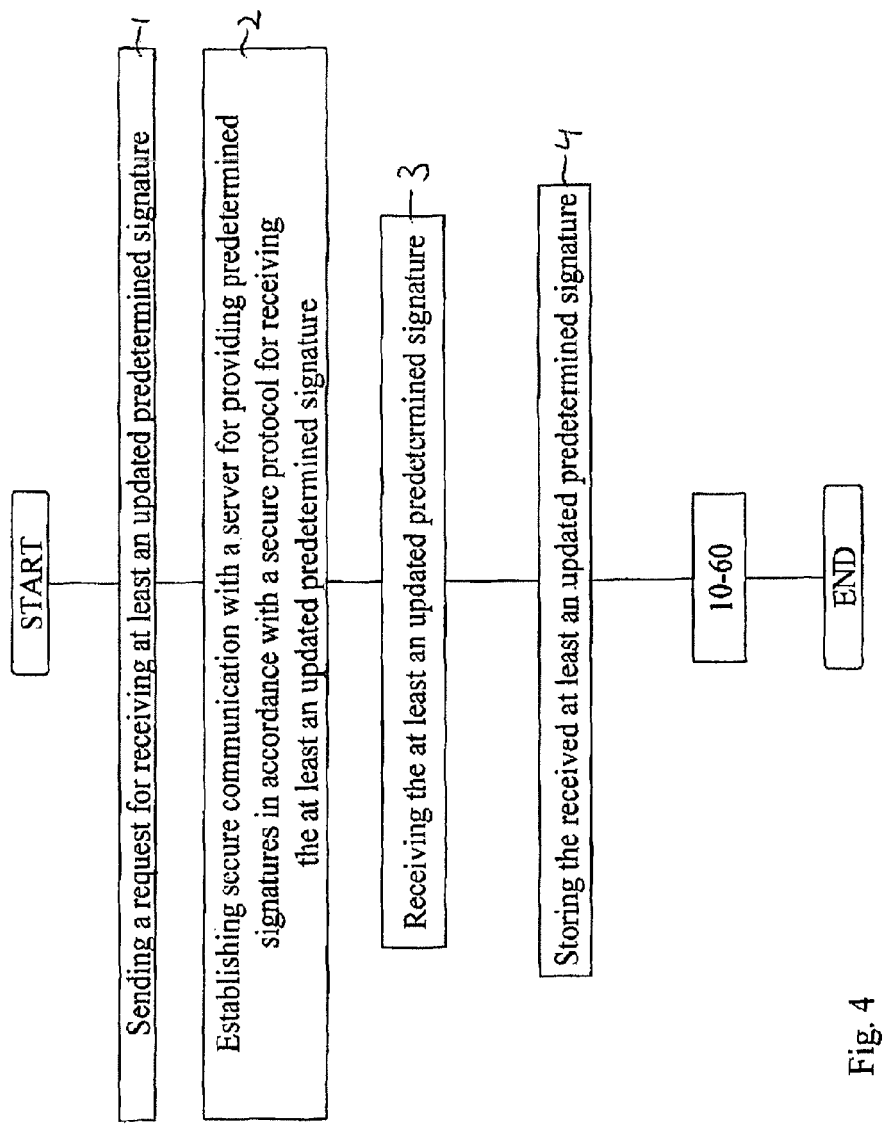
FIG. 4 is a simplified flow diagram illustrating a second embodiment of a method for supporting scanning of data for signatures prior to storage according to the invention.

Of course, the scanning for computer viruses is only effective when the predetermined signatures are up-to-date. Referring to FIG. 4, a simplified flow diagram of a second embodiment of a method for scanning data for signatures prior to storage according to the invention is shown. At 1, the processor 110 of the storage device sends a request for receiving at least an updated predetermined signature to the host system 150. The request is received by the processor 160 of the host system 150 which then initiates establishing of a secure communication in accordance with a secure protocol between the processor 110 and a server for providing predetermined signatures 175 via a communication network 170 such as the Internet and port 165. Alternatively, the processor 110 sends the request via the host system 150 directly to the server 175, omitting the processor 160. Further alternatively, the server 175 initiates establishing of a secure communication, for example, in predetermined intervals or when new signatures are available. This is advantageous when the storage device is a non-portable storage device, as shown in FIGS. 1b to 1d, ensuring that the signatures are up-to-date. In portable storage devices, the processor 110 sends the request, for example, after the portable storage device 100 is mated with the host system 150 or, alternatively, when a request from the processor 160 for storing data is received. At 2, a secure communication between the processor 110 and the server 175 is established. The communication is secured using, for example, encoding such as an encryption method. Encryption methods are divided into symmetric key methods—secret-key cryptography—and asymmetric key methods—Public-key cryptography. In a symmetric key method, for example, DES and AES, the sender and receiver have a shared key set up in advance and kept secret from all other parties; the sender uses this key for encryption and the receiver uses the same key for decryption. In an asymmetric key method, for example, RSA, there are two separate keys, a public key is published and enables any sender to perform encryption, while a private key is kept secret by the receiver and enables only him to perform decryption. Optionally, to further enhance security the keys are provided by a "trusted source" 180 such as a key service provider via the communication network 170. The received key is then, for example, stored in the temporary storage medium 115 and after decryption of the updated predetermined signatures—received at 3—deleted. Alternatively, the key is stored in memory for establishing future secure communication with the server 175. Upon receipt, the updated predetermined signatures are stored in the signature memory 130—at 4. The steps 1 to 4 are then followed by the steps 10 to 60 shown in FIG. 2. Optionally, the processor 110 includes in the request data indicative of a last update of the predetermined signatures. This is especially beneficial in portable storage devices reducing the number of signatures to be transmitted for an update.

Referring to FIG. 5, a third embodiment 300 of a storage device according to the invention is shown. The storage device 300 comprises an unscanned data memory 145 in communication with the port 105. For example, the provision of the unscanned data memory 145 enables a user to quickly store the first data without scanning or to store the first data if they contain portions similar to the signatures. Optionally, the unscanned data memory 145 is used for data storage and retrieval without involvement of the processor 110, thus reducing the risk of spreading a computer virus to data stored in the scanned data memory 125.

Figure 6:
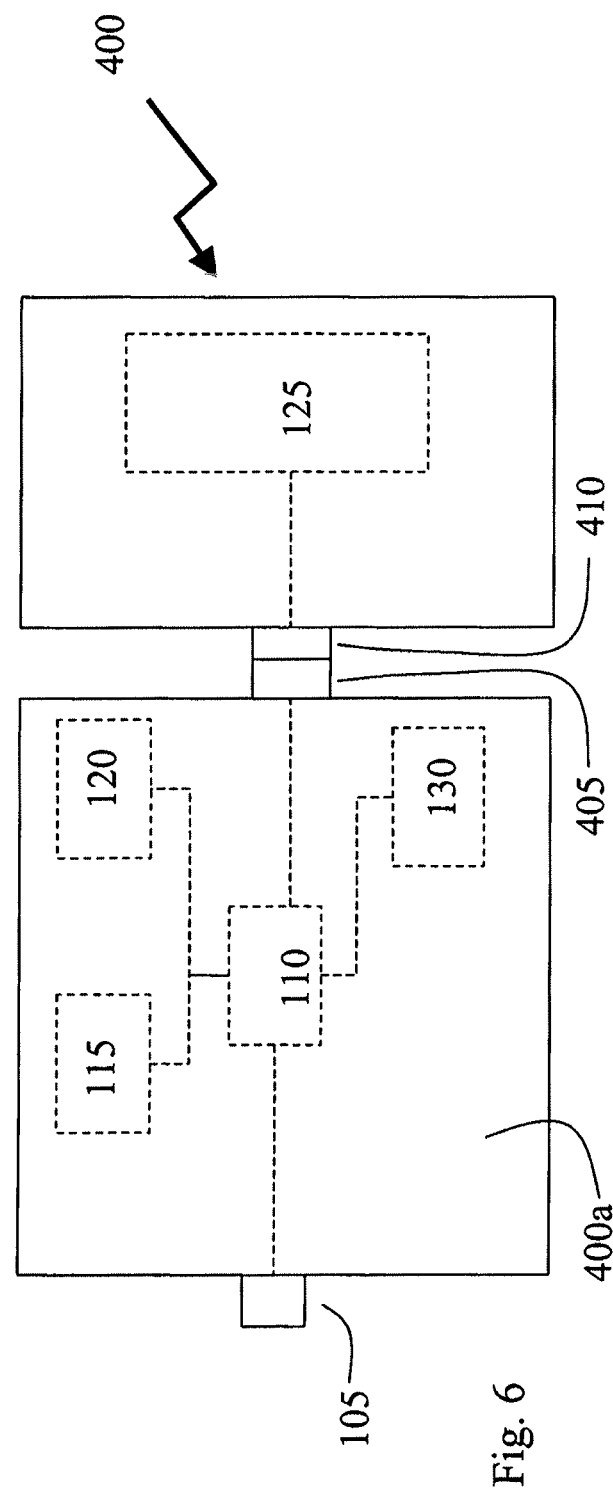
FIG. 6 is a simplified block diagram illustrating a fourth embodiment of a storage device supporting scanning of data for signatures prior to storage according to the invention.

Referring to FIG. 6, a fourth embodiment 400 of a storage device supporting scanning data for signatures prior to storage according to the invention is shown. The storage device 400 is of similar structure as the storage device 100, however, the components are disposed in two housings 400A and 400B with: the housing 400A comprising the port 105, the processor 110, the temporary storage medium 115, the memory 120, and the signature memory 130; and the housing 400B comprising the scanned data memory 125. The scanned data memory 125 is in communication with the processor 110 via mated ports 405 and 410 of the housing 400A and 400B, respectively, for receiving guaranteed previously scanned data. Alternatively, the processor 110 comprises electronic circuitry designed for performing a portion of the communication and data processing in a hardware implemented fashion. Further alternatively, the peripheral device comprises electronic circuitry for performing the complete communication and data processing in a hardware implemented fashion, thus allowing omission of the memory 120.

Optionally, the port 105 is a serial USB port, for example, a male USB connector with a USB extension cable 406, for interfacing with a female USB port 155 of the host system 150. Use of a USB cable allows flexibility in positioning the storage device 400A. Further optionally, the ports 405 and 410 are a female and a male USB connector, respectively. The peripheral device 400 is, for example, implemented using commonly available USB memory storage key technology. Furthermore, it allows implementation of the housing 400B and its components using off-the-shelf USB memory sticks.

Figure 7:
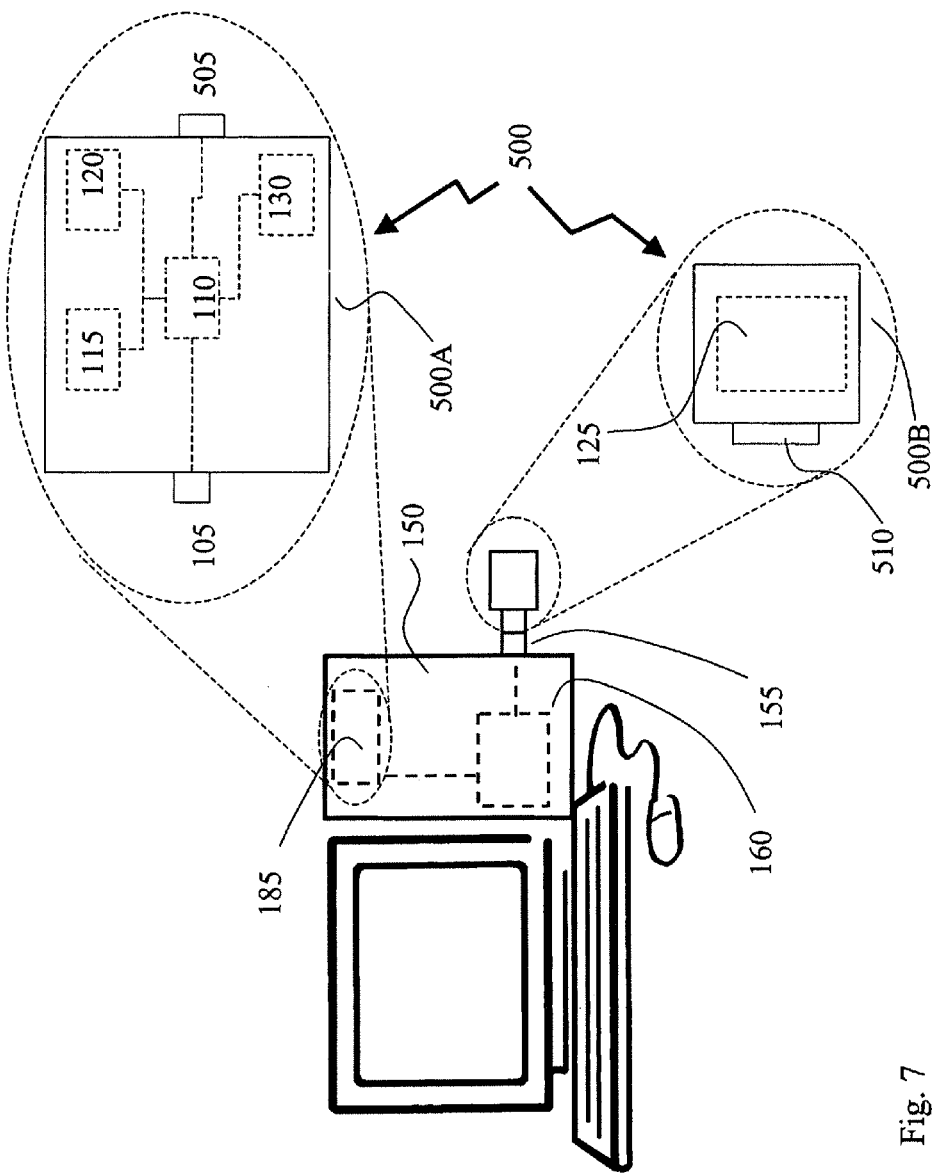
FIG. 7 is a simplified block diagram illustrating a fifth embodiment of a storage device supporting scanning of data for signatures prior to storage according to the invention.

Referring to FIG. 7, a fifth embodiment 500 of a storage device supporting scanning data for signatures prior to storage according to the invention is shown. The storage device 500 is of similar structure as the storage device 400 with the components being disposed in two housings 500A and 500B. The housing 500A comprises the port 105, the processor 110, the temporary storage medium 115, the memory 120, and the signature memory 130, and the housing 500B comprises the scanned data memory 125. The housing 500A is disposed inside a housing of the host system 150 and connected to a bus system 185 such as a serial bus of the host system 150 via port 105. The housing 500A further comprises an external port 505 for mating with port 510 of the housing 500B for providing communication between the processor 110 and the scanned data memory 125. Optionally, the external port 505 is omitted and communication between the scanned data memory 125 and the processor 110 is enabled via the port 105, the bus system 185 and the port 155 of the host system 150 having the port 510 of the housing 500B mated thereto. Alternatively, the processor 110 comprises electronic circuitry designed for performing a portion of the communication and data processing in a hardware implemented fashion. Further alternatively, the peripheral device comprises electronic circuitry for performing the complete communication and data processing in a hardware implemented fashion, thus allowing omission of the memory 120.

For example, the housing 500A comprises a PCB, which is inserted into an expansion slot of the host system 150 and has an interface for connection to a USB bus system, while the housing 500B and its components are implemented using off-the-shelf USB memory sticks.

Another significant security challenge, especially for large organizations such as government departments and larger corporations, has arisen due to the increasing storage capacity of USB memory storage keys. Their small size and ease of use allows unsupervised visitors or unscrupulous employees to smuggle confidential data with little chance of detection.

Figure 8:
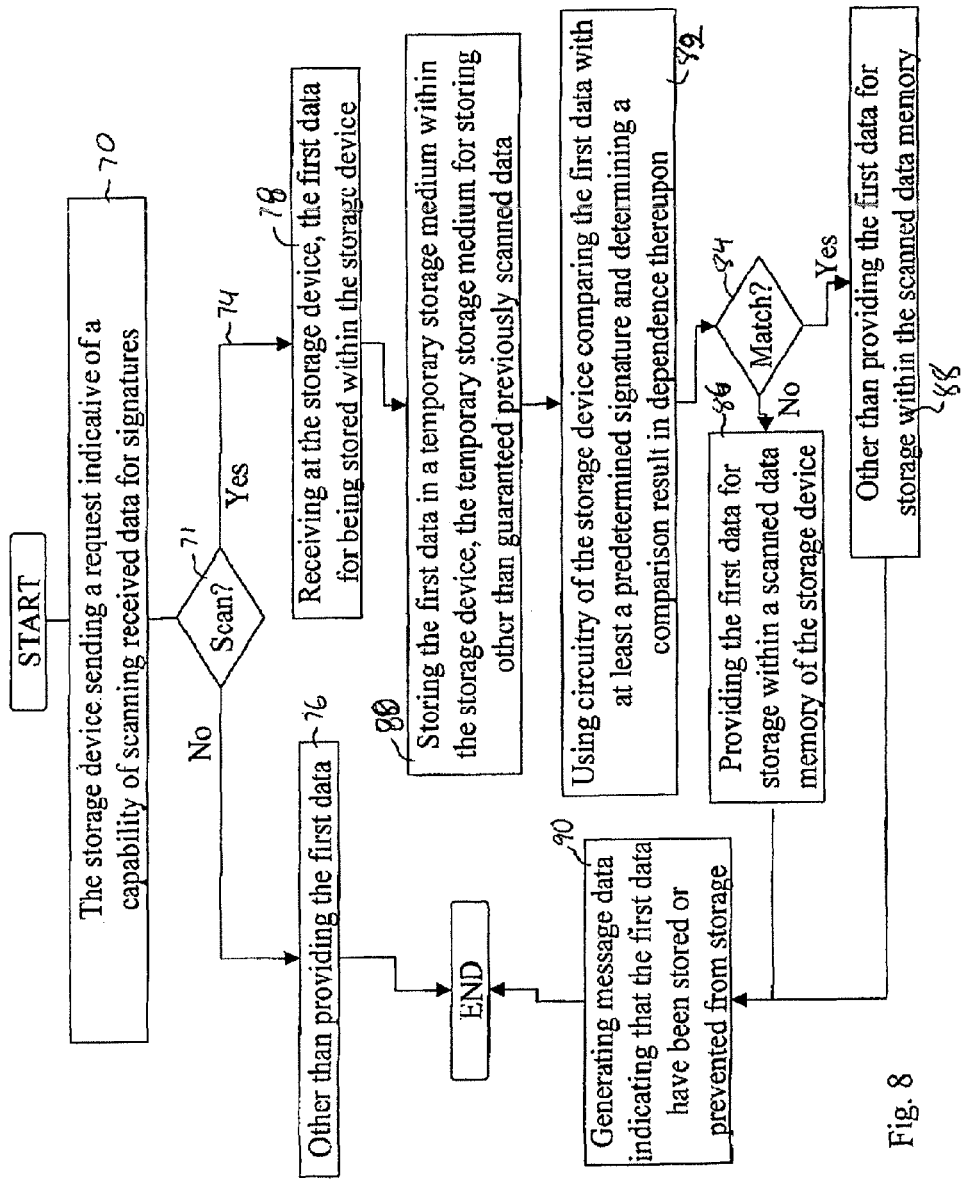
FIG. 8 is a simplified flow diagram illustrating a third embodiment of a method for supporting scanning of data for signatures prior to storage according to the invention.

The following embodiments of a method for scanning data for signatures prior to storage according to the invention provide a solution to this significant security problem. Referring to FIG. 8, a simplified flow diagram of a third embodiment of a method for scanning data for signatures prior to storage according to the invention is shown. It is noted that this embodiment is beneficially employed with the storage devices according to the invention as illustrated above. Here, the capability of the storage devices to scan received data for signatures is exploited by inserting pieces of a security code called "security signatures" into sensitive data. In its simplest form, a same security signature is implanted at one location in the data. The location is, determined, for example, by an authorized person such as a system administrator or on a substantially random basis. Alternatively, a plurality of, possibly different, signatures are inserted in the data, thus increasing security.

At 70, a storage device according to the invention sends data indicative of a capability for scanning received data for signatures. The data are received by the processor 160 of the host system 150 and processed. At 71, when the processor 160 identifies a scanning capability of the storage device, first data are provided thereto—at 74, otherwise the processor performs instructions other than providing the first data—at 76—such as generating a message prompting the user to use a storage device having the scanning capability. The process for performing the steps 70 to 76 is, for example, stored in a storage medium having stored therein executable commands for execution on the processor 160 of the host system 150. At 78, the first data for being stored are received at the storage device. Upon receipt the first data are stored in the temporary storage medium 115 for storing other than guaranteed previously scanned data—at 80. Using the processor 110 of the storage device, the first data are compared with at least a predetermined security signature indicative of a security level and a comparison result is determined in dependence thereupon—at 82. In dependence upon the comparison result—at 84—the first data are provided to the scanned data memory 125 when the comparison result is indicative of other than a match—at 86—or the first data are other than provided to the scanned data memory 125 when the comparison result is indicative of a match—at 88. For example, at 88 the received first data are deleted from the temporary storage medium 115. Optionally, the processor 110 generates—at 90—message data indicating that the first data have been stored or prevented from storage and provides the same to the processor 160 for displaying the message to the user. Alternatively, the storage device comprises an indicator such as a LED, not shown, for notifying the user, for example, by displaying different colors such as Green when the data have been stored and Red when the data have been prevented from storage.

The method illustrated in FIG. 8 is optionally highly beneficial for scanning the first data for security signatures by ensuring that sensitive data or data of a predetermined security level are prevented from storage in a storage device.

Figure 9:
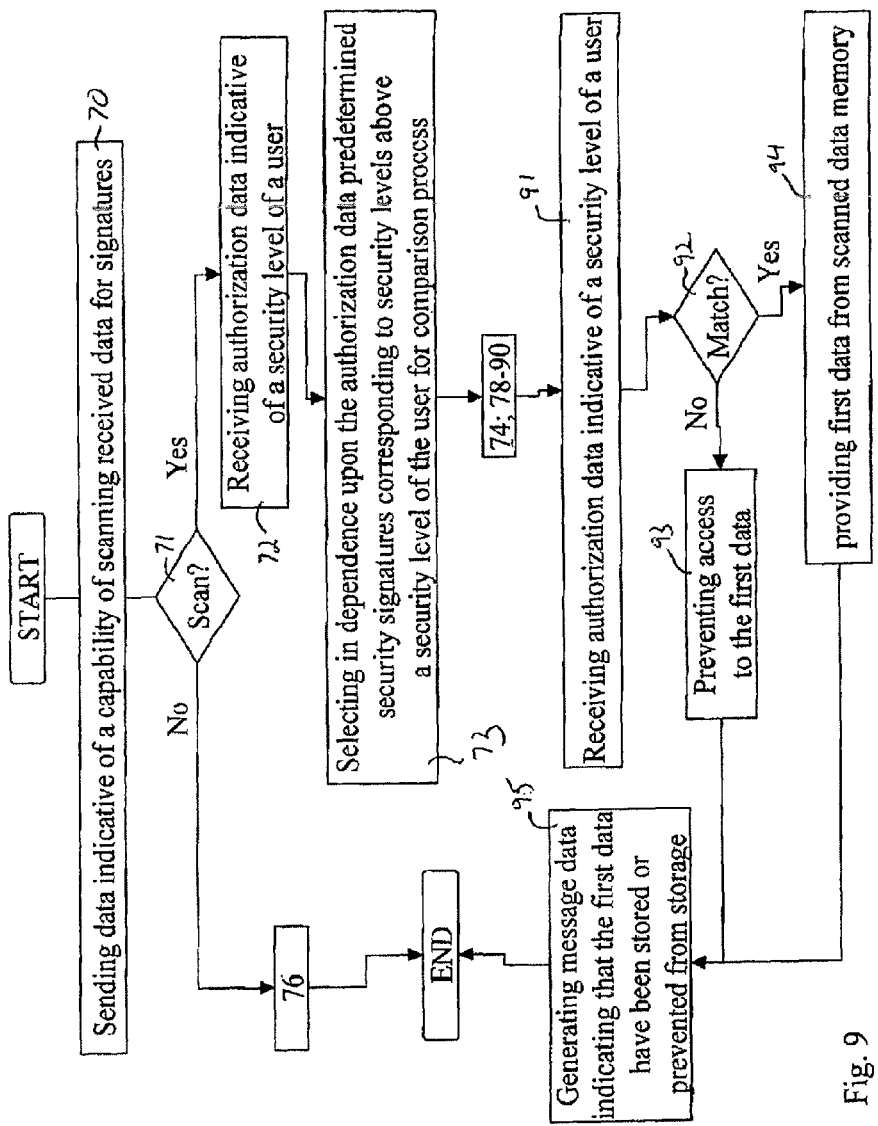
FIG. 9 is a simplified flow diagram illustrating a fourth embodiment of a method for supporting scanning of data for signatures prior to storage according to the invention.

Referring to FIG. 9, a simplified flow diagram of a fourth embodiment of a method for scanning data for signatures prior to storage according to the invention is shown. Again, it is noted that this embodiment is beneficially employed with the storage devices according to the invention as illustrated above. Here too, the capability of the storage devices to scan received data for signatures is exploited by inserting pieces of a security code called "security signatures" into sensitive data. To increase flexibility a plurality of different signatures, each associated with a predetermined level of security, are inserted in the respective data. Inserting different signatures associated with different levels of security allows differentiating, for example, between users having different levels of security or between users belonging to different departments of an organization.

The fourth embodiment of the method, as shown in FIG. 9, starts with the same steps 70, 71, and 76 for identifying if the storage device has a scanning capability and prevents the data from storage if the scanning capability is missing. At 72, the processor 110 of the storage device receives authorization data indicative of a security level of a user of a host system 150 in communication with the storage device. Optionally, the authorization data are received in an encoded fashion from the host system. For example, the authorization data are encoded using an encryption method, as discussed above. Alternatively, the authorization data are hashed. The processor 110 then selects—at 73—in dependence upon the authorization data predetermined security signatures corresponding to security levels above a security level of the user for the comparison process at 82. The step 73 is then followed by the same steps 74 to 90 as shown in FIG. 8. As is evident, this embodiment substantially increases flexibility by allowing storage of data according to a user specific security level. For example, board members of a large organization are enabled to store data of the highest security level while directors are prevented from storing such data but are enabled to store mid security level data and other staff is prevented from storing data of any of these security levels. Furthermore, it is possible to differentiate between data belonging to various departments of a large organization such as research, sales, human resources, etc.

The following steps 91 to 95 of the fourth embodiment are highly beneficial by preventing access to sensitive data stored in a portable storage device by an unauthorized person, for example, when the portable storage device has been lost, stolen, or misplaced. At 91, the processor 110 of the storage device receives second authorization data indicative of a second security level of a user of a host system 150 in communication with the storage device. The processor 110 then compares—at 92—the second authorization data with the security level of the first data stored in the scanned data memory 125. For example, after storage of the first data the processor 110 generated data indicative of the security level of the user and stored the same together with the first data or, alternatively, stored the selected predetermined signatures together with the first data. If the second security level is below the security level of the first data, the processor 110 prevents access to the first data—at 93. If the second security level is one of equal to the security level of the first data and higher than the security level of the first data, the first data are provided from the scanned data memory 125—at 94. Alternatively, the data are provided only when the second security level matches the security level of the first data. Optionally, the processor 110 generates—at 95—message data indicating that the first data are accessible or prevented from access and provides the same to the processor 160 for displaying the message to the user. Alternatively, the storage device comprises an indicator such as a LED, not shown, for notifying the user, for example, by displaying different colors such as Green when the data are accessible and Red when the data are prevented from access.

Referring to FIG. 10, a sixth embodiment of a storage device for supporting scanning of data for signatures prior to storage according to the invention is shown. Here, the storage device 600 is of similar structure as the device shown in FIG. 1a, but additionally comprises a biometric input device 605 in communication with the processor 110 for determining a user authorization according to the fourth embodiment of a method for scanning data for signatures prior to storage according to the invention is shown. Alternatively, the biometric input device is implemented in other storage devices according to the invention in a similar fashion. In operation, the processor 110 provides the biometric input data to a processor 160 of a host system 150 for determining a security level of the user in dependence thereupon and receives authorization data from the processor 160 of the host system 150. Optionally, the biometric input data are sent and the authorization data are received in an encoded fashion. For example, the biometric input data and the authorization data are encoded using an encryption method, as discussed above. Alternatively, the biometric input data and the authorization data are hashed. Alternatively, using the processor 110 of the storage device 600, the biometric input data are compared with biometric data indicative of a user stored in memory of the storage device 600 and a security level of the user is determined in dependence thereupon. This enables processing of the provided biometric input data as well as the sensitive stored data indicative of a user within a single portable housing, thus the efficacy of tampering is substantially reduced.

As above, the storage device 600 is, for example, implemented using readily available USB memory storage key technology. Furthermore, biometric input devices such as contact fingerprint imagers are also readily available in a compact fashion suitable for disposing in a USB memory storage key housing. The peripheral device 600 provides a biometric input device 605 together with memory for storing sensitive data indicative of a user, a processor 110 for determining user authorization, and scanned data memory 125 for storing data in dependence upon user authorization in a single compact housing suitable for carrying in a pocket.

Optionally, user authorization using biometric input data is used for determining a security level of a user prior retrieval of the data stored in the scanned data memory 125.

Referring to FIG. 11, a seventh embodiment of a storage device for supporting scanning of data for signatures prior to storage according to the invention is shown. Here, the storage device 700 is of similar structure as the device shown in FIG. 6, but additionally comprises a biometric input device 705 implemented in a first housing 700A and in communication with the processor 110 for determining a user authorization according to the fourth embodiment of a method for scanning data for signatures prior to storage according to the invention is shown. In operation, the processor 110 provides the biometric input data to a processor 160 of a host system 150 for determining a security level of the user in dependence thereupon and receives authorization data from the processor 160 of the host system 150. Optionally, the biometric input data are sent and the authorization data are received in an encoded fashion. For example, the biometric input data and the authorization data are encoded using an encryption method as discussed above. Alternatively, the biometric input data and the authorization data are hashed. Alternatively, using the processor 110 of the storage device 700 in housing 700A, the biometric input data are compared with biometric data indicative of a user stored in memory of the storage device and a security level of the user is determined in dependence thereupon. Optionally, the storage device 700 comprises a second processor 710 in the second housing 700B for receiving second authorization data indicative of a second security level of a user and for comparing the second security level of the user with data indicative of the security level of the first data stored in the scanned data memory 125 which are stored, for example, together with the first data in the scanned data memory 125. Employment of the processor 710 is highly beneficial by preventing access to sensitive data stored in the scanned data memory 125 of the portable storage device 700B by an unauthorized person, for example, when the portable storage device 700B has been lost, stolen, or misplaced.

The storage device 700 is, for example, implemented using readily available USB memory storage key technology, allowing implementation of the housing 700B and its components using off-the-shelf USB memory sticks. Furthermore, biometric input devices such as various types of fingerprint imagers, cameras for retinal scans or face recognition, or microphones for voice recognition are also readily available together with software for processing the biometric information and are implementable in the peripheral device 700A.

Obviously, one skilled in the art will readily arrive at numerous combinations of the various embodiments of the method and storage device for supporting scanning of data for signatures prior to storage according to the invention in order to satisfy specific needs in different applications.

Numerous other embodiments of the invention will be apparent to persons skilled in the art without departing from the spirit and scope of the invention as defined in the appended claims.

What is claimed is:

1. A method for storing data in a portable device coupled to a host system, the method comprising:
   receiving data from the host system for being stored within the portable device;
   storing the data in temporary storage within the portable device;
   scanning the data in the temporary storage using processor circuitry of the portable device for comparing the data with computer virus signatures stored on the portable device;
   determining a comparison indicative of a match between the data in the temporary storage and at least one of the computer virus signatures;
   providing the data for storage within data memory of the portable device when the comparison is not indicative of the match;
   deleting the data from the temporary storage without providing the data for storage within the data memory when the comparison is indicative of the match;
   receiving at the portable device updated computer virus signatures indicative of known computer viruses, wherein the updated computer virus signatures are encrypted with a key provided by a trusted source key service provider;
   establishing secure communication via the host system in accordance with a secure protocol for receiving the updated computer virus signatures from a server; and
   storing the key in the temporary storage of the portable device and deleting the key from the temporary storage after decryption of the updated computer virus signatures.

2. A method as defined in claim 1 comprising sending a request to the server via the host for receiving the updated computer virus signatures, the request including data indicative of a last update of the computer virus signatures.

3. A method as defined in claim 2 wherein the request is sent after the portable device is mated with the host system.

4. A method as defined in claim 1 comprising storing the data in a buffer memory on the portable device when the comparison is indicative of the match.

5. A method as defined in claim 4 comprising repairing the data in the buffer memory when the comparison is indicative of the match.

6. A method as defined in claim 1 comprising storing the data in a buffer memory on the portable device, the buffer memory configured for scanning the data using the processor circuitry after removal of the portable device from the host system.

7. A method as defined in claim 6 comprising:
   generating message data indicating that a computer virus has been detected when the comparison is indicative of the match;
   storing the message data in the buffer memory; and
   notifying a user of the host system that the computer virus has been detected after the portable device is mated with the host system.

8. A method as defined in claim 1 wherein the data comprise a security signature indicative of a security level of the data.

9. A method as defined in claim 8 comprising preventing storage of the data in the data memory when the comparison is indicative of a match between the data and the security signature.

10. A method as defined in claim 8 comprising receiving authorization data indicative of a security level of a user of the host system.

11. A method as defined in claim 10 comprising providing the data from the data memory to the host system when the security level of the user is equal to or higher than the security level of the data and preventing access to the data within by the host system when the security level of the user is below the security level of the data.

12. A method as defined in claim 10 wherein receiving authorization data comprises receiving biometric information from the user from a biometric sensor on the portable device and determining the security level of the user in dependence thereupon.

13. A portable device comprising:
   a port configured for receiving data from a host system for being stored within the portable device;
   temporary storage in communication with the port and configured for storing the data;
   processor circuitry in communication with the port, the temporary storage and data memory, the processor circuitry configured for:
      scanning the data in the temporary storage by comparing the data with computer virus signatures stored on the portable device;
      determining a comparison indicative of a match between the data in the temporary storage and at least one of the computer virus signatures;
      providing the data for storage within the data memory when the comparison is not indicative of the match; and
      deleting the data from the temporary storage and not providing the data for storage within the data memory when the comparison is indicative of the match; and a biometric input device in communication with the processor circuitry, the processor circuitry configured for receiving biometric input from the biometric input device;

wherein the processor circuitry is configured for determining a security level of the user in dependence upon the biometric input;

wherein the data comprise a security signature embedded therein, the security signature indicative of a security level of the data; and wherein the processor circuitry is configured for preventing access to the data stored within the data memory when the security level of the user is below the security level of the data.

14. A portable device as defined in claim 13 wherein the processor circuitry is configured for storing the computer virus signatures in the temporary storage.

15. A portable device as defined in claim 13 comprising a non-transitory computer readable storage medium in communication with the processor circuitry, the storage medium having stored therein executable commands for execution on the processor circuitry when scanning the data in the temporary storage.

16. A portable device as defined in claim 13 comprising a buffer memory in communication with the processor circuitry and configured for storing the data prior to scanning by the processor circuitry, after removal of the portable device from the host system.

17. A portable device as defined in claim 16 comprising an internal power source configured to enable the scanning of the data in the buffer memory by the processor circuitry after removal of the portable device from the host system.

18. A portable device as defined in claim 13 comprising an external hard-drive storage device.

19. A portable device as defined in claim 13 wherein the port comprises a serial port configured for coupling to an external port of the host system.

20. A portable device as defined in claim 19 wherein the serial port comprises a USB port.

21. A portable device as defined in claim 13 comprising an external CD device or an external DVD device.

22. A portable device as defined in claim 13 comprising a flash memory card.

23. A portable device as defined in claim 13 wherein the biometric input device comprises a fingerprint imager.

24. A portable device comprising:
an interface configured for coupling to a port of a host system for receiving data for being stored in the portable device;
temporary storage in communication with the interface and configured for storing the data;
processor circuitry in communication with the interface, the temporary storage data memory, the processor circuitry configured for:
scanning the data in the temporary storage by comparing the data with computer virus signatures stored on the portable device;
determining a comparison indicative of a match between the data and at least one of the computer virus signatures;
providing the data for storage within the data memory when the comparison is not indicative of the match; and
deleting the data from the temporary storage without providing the data for storage within the data memory when the comparison is indicative of the match;

wherein the processor circuitry is configured for preventing storage of the data within the data memory when the comparison is indicative of a match between the data and a security signature implanted within the data; and wherein the processor circuitry is configured for preventing access to the data stored within the data memory when a security level of the user is below a security level of the data.

25. A portable device as defined in claim 24 wherein the interface comprises a parallel interface configured for coupling to the port of the host system.

26. A portable device as defined in claim 24 wherein the interface comprises a USB interface.

27. A portable device as defined in claim 24 comprising a non-transient computer readable data storage medium in communication with the processor circuitry, the storage medium having stored therein executable commands for execution on the processor circuitry when scanning the data in the temporary storage.

28. A portable device as defined in claim 24 comprising a biometric input device in communication with the processor circuitry, the processor circuitry configured for receiving biometric input from the biometric input device and for determining a security level of a user of the host device in dependence thereupon.

29. A portable device as defined in claim 24 wherein the interface is configured for coupling to an expansion slot disposed in the host system.

30. A portable device comprising:
a non-transitory computer readable data storage medium having stored therein program data comprising executable commands for execution on a processor of a host system coupled to the portable device, the processor when executing the commands performing a method comprising:
providing data to the portable device for storage therein, the data having an embedded security signature indicative of a security level of the data;
processor circuitry on the portable device, the processor circuitry configured for:
storing the data in temporary storage on the portable device;
scanning the data in the temporary storage by comparing the data with computer virus signatures stored on the portable device;
determining a comparison indicative of a match between the data in the temporary storage and at least one of the computer virus signatures;
providing the data for storage within data memory in the portable device when the comparison is not indicative of the match; and
deleting the data from the temporary storage without providing the data for storage within the data memory when the comparison is indicative of the match;
wherein the processor circuitry is configured for preventing storage of the data in the data memory when the comparison is indicative of a match between the data and the security signature;
wherein the processor circuitry is configured to receive authorization data indicative of a security level of a user of the host system; and
wherein the processor circuitry is configured for providing the data from the data memory to the host system when the security level of the user is equal to or higher than the security level of the data, and preventing access to the data within the data memory by the host system when the security level of the user is below the security level of the data.

31. A portable device as defined in claim 30 wherein the processor circuitry is configured for preventing storage of the data in the data memory when the comparison is indicative of a match between the data and the security signature.

32. A portable device as defined in claim 30 comprising a buffer memory configured for storing the data, wherein the processor circuitry is configured for repairing the data in the buffer memory when the comparison is indicative of the match.

33. A portable device as defined in claim 32 wherein the processor circuitry is configured for scanning the data in the buffer memory after removal of the portable device from the host system.

34. A portable device as defined in claim 33 wherein the processor circuitry is configured for notifying a user of the host system that the computer virus has been detected after the portable device is mated with the host system.

35. A portable device as defined in claim 30 comprising a disk drive or flash memory card.

36. A method as defined in claim 1 comprising displaying an indicator on the portable device notifying a user of the host system that the computer virus has been detected when the comparison is indicative of the match.

37. A method as defined in claim 9 comprising displaying an indicator on the portable device notifying a user of the host system that the data have been prevented from storage within the data memory when the comparison is indicative of a match between the data and the security signature.

38. A method as defined in claim 11 comprising preventing access to the data within the data memory by the host system when the security level of the user is below the security level of the data.

39. A method as defined in claim 12 wherein the biometric information comprises a fingerprint image of the user.

40. A portable device as defined in claim 13 wherein the processor circuitry is configured for preventing storage of the data within the data memory when the comparison is indicative of a match between the data and the security signature.

41. A portable device as defined in claim 24 comprising a disk drive or flash memory card.

* * * * *